Feb. 27, 1934.  O. K. NICOLAI  1,948,797
MINER'S PAN
Filed July 25, 1932
Fig.1
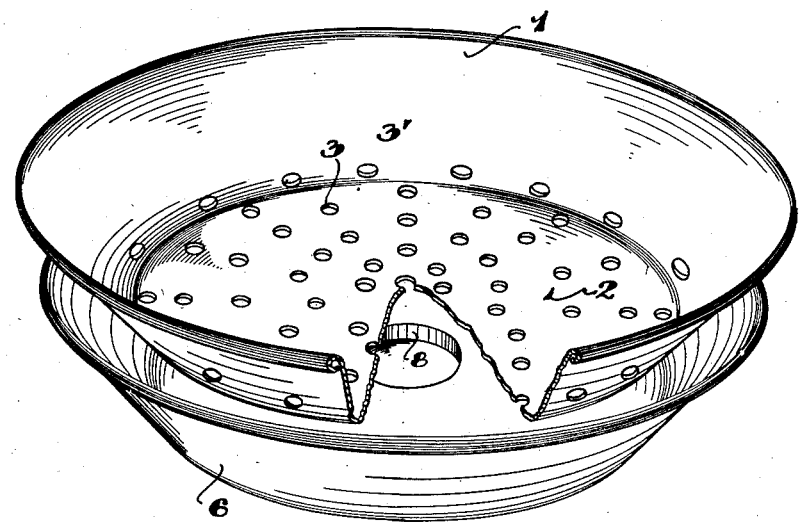
Fig.2a  Fig.2
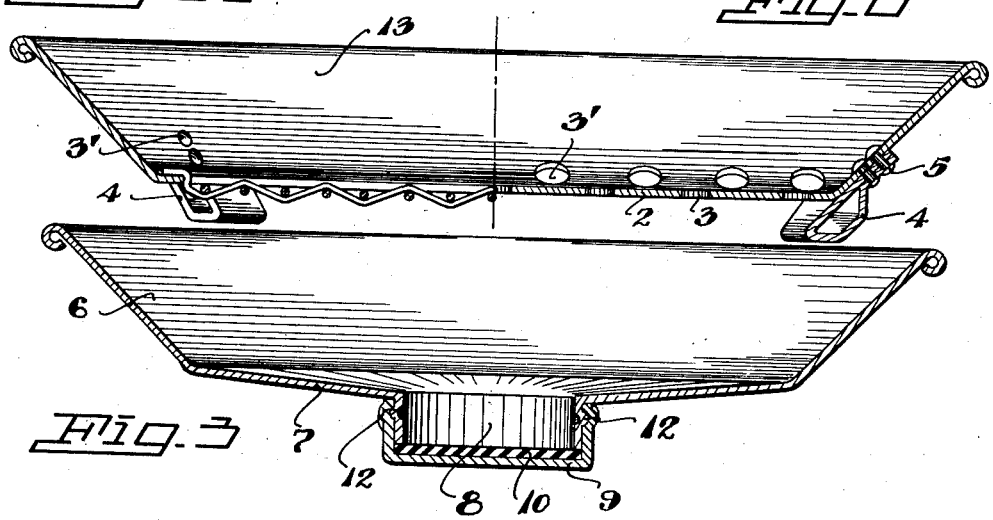
Fig.3
Fig.4
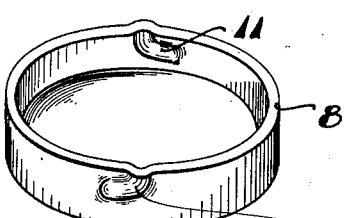
OTTO K. NICOLAI
Inventor
By  Herbert E. Smith
Attorney Patented Feb. 27, 1934

1,948,797

UNITED STATES PATENT OFFICE 1,948,797

MINER'S PAN

Otto K. Nicolai, Wallace, Idaho

Application July 25, 1932. Serial No. 624,515

1 Claim. (Cl. 209—447)

My present invention relates to an improved miner's pan especially designed and adapted for use in "panning" or separating gold and other precious metals from native clay, gravel, sand, &c., the primary object of the invention being the provision of means whereby expenditure of manual labor in the process of separating is reduced, and the capacity of the panning implement is increased. As is well known to those familiar with the panning process of separation, a single imperforate pan is agitated or manipulated by hand in such manner as to dislodge, separate, and throw over the edge of the pan the coarse materials, or materials of large granular sizes that are undesirable. The pan may contain a quantity of water placed therein with the material to be separated, or water may be added to the pan, to assist in floating the coarser materials, as particles or grains of sand, and casting them over the edge of the pan as the latter is manually agitated. The heavy and fine materials remain in the pan after the separation of the coarse and light materials therefrom, and from the residue the grains of gold are collected.

I have discovered that by the combined use of two pans of special construction as herein illustrated, the steps in the separation process may be carried out more effectively, with less expenditure of labor and time, and with a higher percentage in the recovery of grains of gold, than with the single pan now in use.

My invention consists in certain novel combinations and arrangements of parts involving the utilization of two pans, as will hereinafter be more fully set forth and claimed. In the accompanying drawing I have illustrated one complete example of the physical embodiment of my invention, and a slight modification thereof, wherein the parts are combined and arranged according to modes I have so far devised for the practical application of the principles of my invention.

Figure 1 is a perspective view illustrating the two pans in position for use, the upper pan being partly broken away for convenience in illustration.

Figure 2 is a sectional view showing one half of the upper pan of Figure 1, and Figure 2a is a similar view of one half of a slightly modified form of upper pan.

Figure 3 is a sectional view of the lower pan.

Figure 4 is a perspective view, showing the bottom ring, inverted, of the lower pan with fasteners or fastening members for joint use with complementary members on the bottom cap of the lower pan.

In Figures 1 and 2 the upper pan 1 is illustrated with flaring sides of circular shape, and a flat bottom 2, and the bottom is perforated or foraminated with numerous holes 3 covering the area of the bottom, and some holes 3' are provided in the side wall of the pan just above the bottom.

As best seen in Figure 2 the upper pan is provided with several legs, as 4, fashioned from looped straps of metal, and riveted at 5 to the exterior face of the side of the pan, the legs projecting a predetermined distance below the bottom of the upper pan 1.

The upper pan is adapted to rest on its legs 4 in the lower complementary pan 6, the legs being of sufficient length to elevate the upper pan above the lower pan and provide a space between the pans for the accommodation of heavier and finer materials that are separated from the mass of the upper pan.

As best seen in Figure 3 the lower pan is fashioned with a circular bottom 7 that slopes from its outer edges down toward its center, and this lower pan is fashioned with an exterior bottom ring 8, integral with the pan and open at its bottom, to form a cup for the accumulated gold particles. The open bottom cup is closed by means of a removable cap 9, and a gasket or washer 10 is interposed between the lower edge of the ring and the bottom of the cap to form a water tight joint for the cup.

For fastening the cap on the cup the latter is provided with a pair of short locking threads 11 of spiral formation and stamped from the metal of the cup, and the cap is provided with interior grooves 12, of complementary spiral formation, in order that the cap may be locked on the cup by a slight turn to cause frictional engagement of the threads in the grooves.

In Figure 2a the pan 13 is provided with a reticulated or screen bottom 14 to provide openings in the bottom of the upper pan, and the wall of the pan 13 may also be provided with side openings as 3' similar to the openings in the pan 1.

In both forms of the invention in Figures 2 and 2a the bottom of the upper pan is provided with openings to permit passage of the heavier and finer particles of materials from the upper pan to the lower pan.

In using the nested pans, sand and gravel from a creek-bottom or other source, are shovelled into the upper pan, together with a quantity of water, and the gold particles are to be separated from the other materials by hand-manipulation or agitation of the pans. The light, and coarser, materials in the process of agitation or shaking of the pans are cast over the outer edge of the pan 1, while the heavy and finer materials pass through the openings in the bottom of the upper pan into the lower pan. The materials remaining in the upper pan are examined for the discovery of nuggets, and then cast aside.

The materials contained in the lower pan or pan 6 are now agitated or shaken, by hand manipulation of the pan, and as the bulk of the material has been disposed of from the upper pan, the remainder or residue in the pan 6 may be manipulated or agitated with only slight exertion as compared with the manipulation of the initial load. As the pan 6 is manipulated the lighter sands, clay, etc., are panned out, or cast out over the edge of the pan leaving the gold bearing sand on the sloping bottom 7, and this material is finally worked down the sloping bottom into the cup 8. The cap 9 is then detached from the bottom of the pan 6 and the contained grains of gold are recovered from the gold bearing sand in suitable and appropriate manner.

The sloping bottom 7 of the pan 6 aids materially in the final steps of the process of separation, for the reason that after the gray sand has been separated out, or panned out, the pan may be supplied with a desired quantity of water to insure that the rotary motion, or spiral current, that is imparted to the contents of the pan, will wash the residue into the receptacle in the bottom of the pan 6.

Having thus fully described my invention, what I claim as new and desire to secure by Letters Patent is:—

In a mining implement as described, the combination with an upper pan having openings in its bottom and openings in the lower portions of its side wall, and spacing legs attached at the outer side of its side wall and extending below the bottom of the pan, of a lower pan in which the upper pan is nested, said legs supporting the upper pan in slightly elevated position and with its side wall spaced within the lower pan, said lower pan having an open center and a bottom sloping to said open center, an exterior central ring on the bottom pan and fastening threads thereon, a detachable cup having complementary grooved wall, and a gasket clamped between the edge of the ring and the bottom of the cup.

OTTO K. NICOLAI.